United States Patent [19]
Dixon et al.

[11] Patent Number: 5,104,542
[45] Date of Patent: Apr. 14, 1992

[54] DUAL CHAMBER SEWAGE TREATMENT SYSTEM

[76] Inventors: David B. Dixon, P.O. Box 485, Graton, Calif. 95444; Jerome J. Fife, 1875 Joy Rd., Occidental, Calif. 95465

[21] Appl. No.: 650,676

[22] Filed: Feb. 5, 1991

[51] Int. Cl.⁵ .......................................... B01D 12/00
[52] U.S. Cl. .................................................. 210/532.2
[58] Field of Search .......................... 210/170, 532.2

[56] References Cited

U.S. PATENT DOCUMENTS

| | | | |
|---|---|---|---|
| 1,708,118 | 4/1929 | Carpenter et al. | 210/532.2 |
| 3,109,813 | 11/1963 | Bergsten et al. | 210/532.2 |
| 4,882,046 | 11/1989 | Waite | 210/532.2 |

Primary Examiner—Bernard Nozick
Attorney, Agent, or Firm—Limbach & Limbach

[57] ABSTRACT

A system for domestic sewage treatment in conjunction with a leaching field or pool is disclosed. The system comprises a substantially cylindrical tank that contains a cylindrical sleeve to form an inner and an outer chamber. The system is simple in design, portable and ideally suited for home use.

9 Claims, 2 Drawing Sheets

DUAL CHAMBER SEWAGE TREATMENT SYSTEM

FIELD OF THE INVENTION

This invention relates generally to a system and method for treating sewage and more particularly to septic tanks for small-scale, domestic sewage treatment.

BACKGROUND OF THE INVENTION

Septic tanks are of course well known in the art. Septic tanks intended for domestic use are generally square or rectangular in construction and usually have two chambers or compartments allowing for digestion, settling and holding of sewage prior to effluent discharge, generally to a leach field. These known systems are disadvantageous in a number of ways. The rectangular configuration is generally weak when buried beneath the soil because of both hydrostatic pressures within the tank and external pressures from soil compaction and movement. Because of these weaknesses and because of the shape, rectangular septic tanks are more costly to build, requiring more man hours to construct and requiring thicker cement and extra steel reinforcing bar over the design described herein.

Although cylindrically configured tanks have been used, these systems have generally been employed in large scale sewage-treatment operations. They tend to be complex with many subchambers and partitions designed for a multi-treatment process. See, for example, U.S. Pat. No. 4,882,046 to Waite. These systems generally incorporate mechanical parts or complicated duct work which require period maintenance. Such maintenance requirements make such systems unsuitable for domestic use because local health authorities generally require that residential septic tanks be essentially maintenance-free, apart from periodic sludge removal by pumping.

There exists therefore a need for a cylindrically configured, inexpensive, easy to install sewage treatment tank for domestic use.

It is therefore an object of the present invention to provide a domestic sewage treatment system that is simple in design and that requires no maintenance once installed, other than periodic pumping.

It is another object of the present invention to provide a domestic sewage treatment system that can readily withstand hydrostatic and ground forces without the need for extra materials and labor.

It is a further object of the present invention to provide a sewage treatment system that is inexpensive and easy to manufacture and install.

SUMMARY OF THE INVENTION

The present invention provides inexpensive, easy to construct sewage treatment system for domestic use. According to the present invention, there is provided a substantially cylindrical-shaped tank. The tank has a side wall, a floor and a top. The tank also comprises a second substantially cylindrical sleeve which is positioned within the tank and joined to the floor of the tank, thereby defining an inner and an outer chamber within the tank. Flow means are provided to allow sewage to be introduced within the tank and thereafter to flow from chamber to chamber during treatment and ultimately, through a discharge means, to be delivered from the tank to a leaching field.

The septic tank of the present invention is clearly superior over known septic tanks in that it provides a structurally superior design that can be more easily installed at a fraction of the cost of conventional rectangular septic tanks.

Other advantages of the present invention will become apparent from the following description of the preferred embodiment and figures and from the claims.

DETAILED DESCRIPTION OF THE INVENTION

Figure 1:
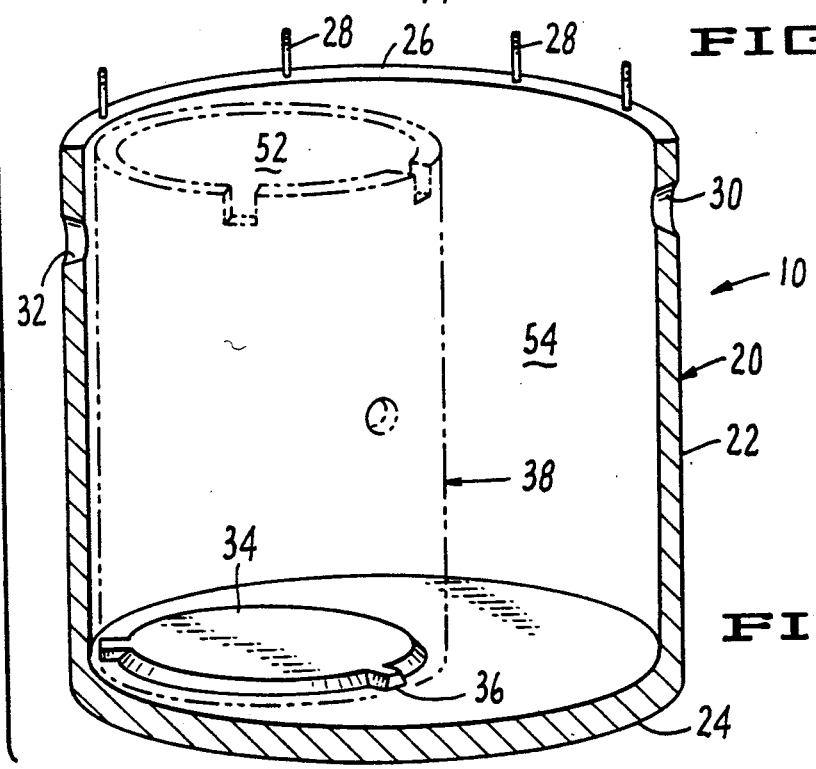
FIG. 1 is an exploded perspective view of a preferred embodiment of the present invention.

The present invention will first be described in its preferred embodiment. Referring now to FIG. 1, the sewage treatment system 10 of the present invention is comprised of a substantially hollow, cylindrical vessel or tank 20 having a curved sidewall 22, a floor 24, and a rim 26. Rim 26 has a plurality of imbedded screws or bolts 28. Side-wall 22 is further provided with a substantially circular inlet hole 30 and an outlet or discharge hole 32. In the preferred embodiment, discharge hole 32 is positioned lower on side-wall 22 than inlet hole 30 with respect to the vertical. Floor 24 is provided with a raised, substantially circular flange 34 which is provided with one or more extensions or keys 36.

Tank 20 may be fabricated out of any appropriate material that is sufficiently strong to resist hydrostatic pressures from within and outside stress delivered by surrounding soil when the unit is installed. Concrete is preferred. The tank may be coated on the interior with an approved waterproof bituminous compound complying with ASTM D 41-78, asphalt primer used in damp-proofing and waterproofing and ASTM D 449-73, Type A, asphalt used in damp-proofing and waterproofing or ASTM D 2825-75, Type I for asphalt roof coatings. Likewise, screws 28 can be made from a variety of materials although steel is preferred.

Sewage treatment system 10 is further provided with an interior sleeve or collar 38. Sleeve 38 has an upper end 40 and a lower end 42. The lower end is provided with notches 44. The notches are configured and positioned so that they match and mate with the extensions of flange 34 when the lower end of sleeve 38 is coupled with flange 34. Sleeve 38 is further provided with a transfer port or hole 48 and a discharge hole 48. Transfer hole 46 is positioned approximately mid-way along wall 39 of sleeve 38. Discharge hole 48 is positioned just under upper end 40 of sleeve 38 at a point so that hole 48 and hole 32 of tank 20 are coincident when sleeve 38 is in place. Emplacement of sleeve 38 creates an inner chamber 52 and an outer chamber 54. Sleeve 38 may be comprised of a variety of suitable substances including but not limited to concrete, fiberglass and steel.

Sewage treatment system 10 is further provided with a disk-shaped lid or cover 60. Lid 60 is comprised of a disk 62 and portal plugs 64. Each portal plug is further provided with a handle 66. Disc 62 is further provided with a plurality of holes 68 so positioned along the periphery of the disc so as to receive and mate with imbedded screws 28 of tank 20. Nuts or other fastening means 70 are used to secure lid 60 to tank 20.

Installation of the preferred embodiment occurs follows. Tank 20 can be cast in concrete. A form or mold is constructed to accommodate the shape and size of tank 20 desired. Welded wire fabric is then tied into the form and concrete is poured in and allowed to set. After the concrete has set up, in about 3 hours, the form is stripped and the tank is allowed to cure. If sleeve 38 is to be composed of concrete, it is similarly cast and allowed to set.

To assemble the tank, a 4 inch plastic coupling is cemented into hole 48 in sleeve 38. Sleeve 38 is lowered into tank 20 so that it mates with flange 34. At this point, holes 30, 46 and 48 are provided with plastic pipe 80 and elbows 82 which are then secured to each other and sealed into place in holes 30, 46, and 48. Next, lid 60 is lowered over the open end of the tank assembly so that holes 68 in lid 60 receive the ends of screws 28. The lid is then secured to the tank assembly with nuts or other fastenings.

During installation, the system is linked up to the domestic sewage line. Once installations is complete, sewage treatment can begin. Raw sewage enters the system through inlet hole 30 and remains in outer chamber 54 where digestion occurs. As the sewage builds up it is forced by hydrostatic pressure into inner chamber 52 through transfer hole 46. clear treated fluid accumulate in inner chamber 52 and are eventually forced out of discharge hold 32 and into a leaching field.

Figure 2:
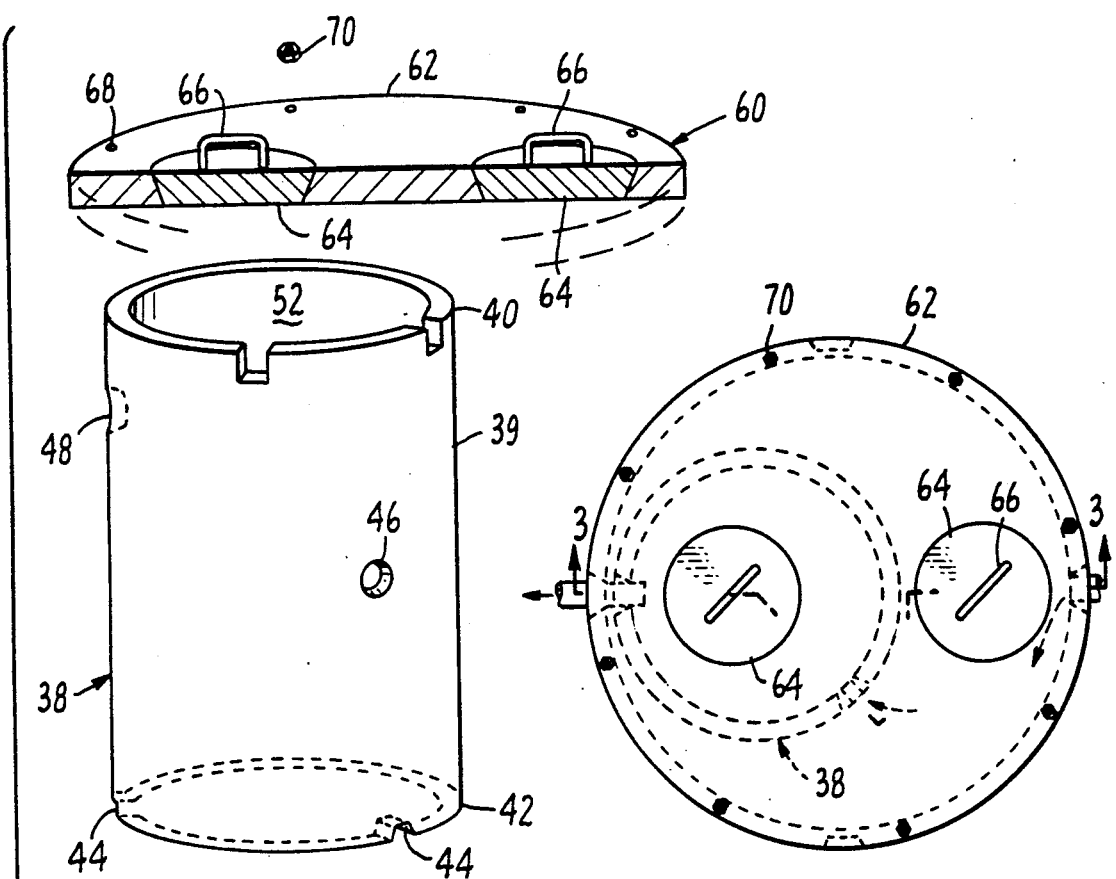
FIG. 2 is a plane view of a preferred embodiment of the present invention.
Figure 3:
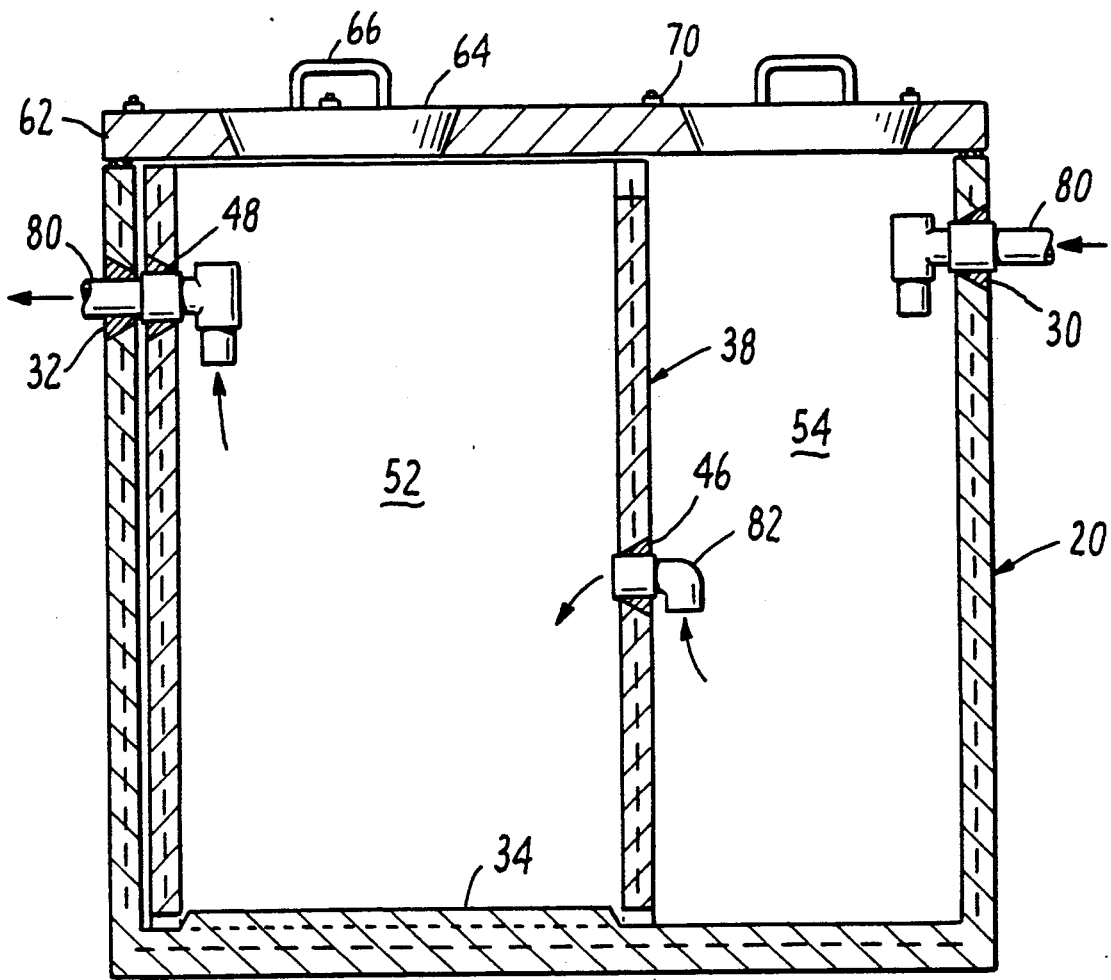
FIG. 3 is a cross sectional side view of a FIG. 2 along the line 3.
Figure 4:
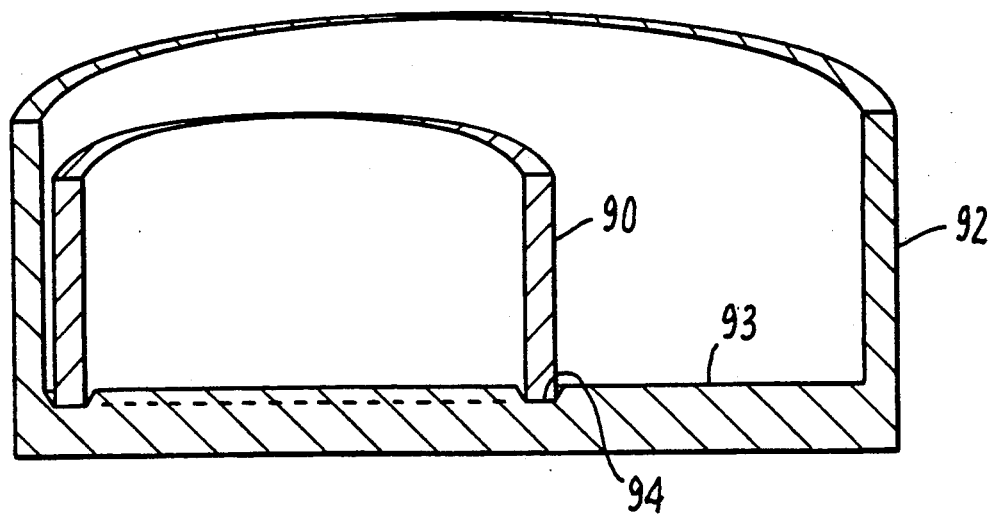
FIG. 4 is a cross sectional side view of an alternate embodiment of the present invention.

FIG. 4 shows an alternative to the preferred embodiment described above and illustrated in FIGS. 1-3. In this embodiment, the floor 93 of tank 92 is provided with a substantially circular groove or depression 90. The dimensions of groove 90 are configured to match the lower end of sleeve 90, so that sleeve 90 simply lowered in the groove which thereby secures the groove to the tank. It should be noted in this embodiment that the lower end of the sleeve need not be provided with notches 44 as shown in FIG. 3, although the presence of such notches would not prevent the use of sleeve 38 with tank 92.

The ease of manufacture of the present invention allows the manufacture to change the size and volume capacities by adding additional circular elements to the forms. The present invention is therefore lighter in design allowing a system that is portable and can be used in various domestic situations.

Other embodiments of the invention include systems where one or more of the containers may be formed from concrete, fiberglass, stainless steel, or any other material of adequate strength and resistance to chemical attack. It should also be noted that the tank capacity may be expanded by adding cylindrical sections to the top of the existing tank and sleeve casting forms.

It is now apparent that the domestic sewage treatment system of the present invention shows marked improvements over known septic tanks designed for domestic and residential applications. It is to be understood that although certain preferred embodiments have been disclosed, illustrated and described above, other embodiments are possible without departing from that which is the invention described herein. It is intended therefore that the invention be defined by the claims that follow as well as the equivalents thereof.

We claim:

1. A domestic multi-chambered sewage treatment system for subterranean use in combination with a leaching field or pool comprising:
    a substantially cylindrical sleeve having an inner chamber and a first diameter;
    a substantially cylindrical tank having a curved sidewall, a floor, and a second diameter greater than the first diameter of said sleeve, the floor provided with placement means for receiving and holding said sleeve in fixed position within said tank so as to define a inner chamber within said sleeve and an outer chamber between said sleeve and the sidewall of said tank;
    lid means for closing said tank;
    flow intake means positioned in the side-wall of said tank for receiving raw sewage and delivering it to said outer chamber for treatment;
    flow transfer means positioned in a portion of said sleeve dividing the inner and the outer chamber to the inner chamber and;
    flow discharge means positioned on said sleeve extending through the side-wall of said tank for delivering treated effluent from the inner chamber exterior to said tank.

2. The sewage treatment system of claim 1 wherein said sleeve has an upper end and a lower end and wherein said placement means is a substantially circular channel formed in the floor of said tank for snug receipt of the lower end of said sleeve.

3. The sewage treatment system of claim 1 wherein the outer chamber has volume substantially twice that of the inner chamber.

4. The sewage treatment system of claim 1 wherein the flow transfer means is positioned closer to the floor of said tank than the flow intake means or flow discharge means.

5. The domestic sewage treatment system of claim 1 wherein said placement means comprises a substantially circular, raised flange for snug receipt of said sleeve.

6. The domestic sewage treatment system of claim 5 wherein said sleeve has an upper end and a lower end, the lower end provided with a first and or second notch and wherein said placement means comprises a raised flange with a first and or second extension so positioned on the flange as to mate with the first and second notches of said sleeve so that said sleeve is snugly received by and secured into place by said flange.

7. A domestic multi-chambered sewage treatment system for subterranean use in combination with a leaching field or pool comprising:
    a substantially cylindrical sleeve having an upper end and a lower end, the lower end provided with a first and or a second notch, said sleeve further having a first diameter;
    a substantially cylindrical tank having a curved sidewall, a floor, and a second diameter greater than the first diameter of said sleeve, the floor provided with a substantially circular raised flange provided with a first and or second extension so configured as to mate with and secure the notches in the lower end of said sleeve and hold said sleeve in fixed position within said tank thereby defining an inner chamber within said sleeve and an outer chamber between said sleeve and the side-wall of said tank, the volume of the inner chamber being substantially one-half the volume of the outer chamber;
    a lid to close said tank;

flow intake means positioned in the side-wall of said tank for receiving raw sewage and delivering it to said outer chamber for treatment;

flow transfer means positioned lower than said flow intake means relative to the floor of said tank in a portion of said sleeve dividing the inner and the outer chamber for delivering treated effluent from the outer chamber to the inner chamber and;

flow discharge means positioned on said sleeve and extending through the side-wall of said tank for delivering treated effluent from the inner chamber exterior to said tank.

8. A system for domestic treatment of sewage comprising:

a container having an inlet chamber and an outlet chamber said outlet chamber formed by a first cylindrical vessel having a bottom and a side, said first cylindrical vessel housed within a larger second cylindrical vessel having a bottom and a side, wherein the first cylindrical vessel extends from the bottom of said first cylindrical vessel to the top edge of said first cylindrical vessel, said top of said second cylindrical vessel aligned flush with said top of said first cylindrical vessel, said inlet chamber formed by said side of said first cylindrical vessel, said side of said second cylindrical vessel, and said bottom of said second cylindrical vessel;

a disc shaped cover attached to said top of said tank, wherein said cover comprises a first and a second access openings wherein said first access opening is located above said inlet chamber and said second access opening is located above said inlet chamber;

first and second access opening covers releasable inserted into said first and second access openings respectively;

a substantially circular raised ridge cast into the bottom of said first cylindrical vessel;

a substantially circular collar located and formed integral on the outside bottom of said second vessel, wherein said raised ridge snugly receives said collar;

a structurally imposed means for permitting the treatment and flow of sewage comprising:

a first inlet port located on a side of said first cylindrical vessels;

a second inlet port located on a side of said second cylindrical vessel;

a first outlet port located on a side of said first cylindrical vessel located lower in vertical height than said first inlet port;

a second outlet port located on a side of said second cylindrical vessel aligned adjacent to said first outlet port so that a continuous hole extends from the outside of said tank into the second chamber;

a first pipe extending from outside said tank through the first inlet port into said first chamber;

a second pipe extending from said first chamber through said second inlet port into said second chamber;

a third pipe extending from said second chamber through the first and second outlet ports into the outside of said tank.

9. A domestic multi-chambered sewage treatment system for subterranean use in combination with a leaching pool consisting of:

a substantially cylindrical sleeve having an inner chamber and first diameter;

a substantially cylindrical tank having a curved sidewall, a floor, and a second diameter greater than the first diameter of said sleeve, the floor provided with placement means for receiving and holding said sleeve in fixed position within said tank so as to define a inner chamber within said sleeve and an outer chamber between said sleeve and the sidewall of said tank;

lid means for closing said tank;

flow intake means positioned in the side-wall of said tank for receiving raw sewage and delivering it to said outer chamber for treatment;

flow transfer means positioned in a portion of said sleeve dividing the inner and the outer chamber for delivering treated sewage from the outer chamber to the inner chamber and;

flow discharge means positioned on said sleeve and extending through the side-wall of said tank for delivering treated sewage from the inner chamber exterior to said tank.

* * * * *